United States Patent [19]

Tomita

[11] Patent Number: 4,721,337
[45] Date of Patent: Jan. 26, 1988

[54] MOTOR DRIVEN SEAT SLIDE MECHANISM

[75] Inventor: Toshihiko Tomita, Hiroshima, Japan

[73] Assignee: Mazda Motor Corporation, Hiroshima, Japan

[21] Appl. No.: 12,544

[22] Filed: Feb. 9, 1987

[30] Foreign Application Priority Data

Feb. 10, 1986 [JP] Japan .................................. 61-27434
Feb. 10, 1986 [JP] Japan ............................. 61-18069[U]

[51] Int. Cl.⁴ ......................... F16M 13/00; A47C 1/02
[52] U.S. Cl. .................................... 297/344; 248/393; 248/429; 297/311
[58] Field of Search ................ 297/344, 311; 248/429, 248/430, 393

[56] References Cited

U.S. PATENT DOCUMENTS 2,864,431 12/1958 Eaton .................................. 248/393
2,929,438 3/1960 Homier ............................. 248/393
4,645,159 2/1987 Terada et al. ...................... 248/429

FOREIGN PATENT DOCUMENTS 60-89044 6/1985 Japan .
60-125230 8/1985 Japan .
60-127238 8/1985 Japan .

Primary Examiner—James T. McCall
Attorney, Agent, or Firm—Burns, Doane, Swecker & Mathis

[57] ABSTRACT

A motor-driven seat slide mechanism comprising a cushion assembly; spaced apart, first and second telescopically extendable guide rail structures one for each side of the cushion assembly, each of the telescopically extendable guide rail structures including upper and lower guide rail members connected one above the other for axial movement relative to each other, the upper and lower guide rail members being connected to the cushion assembly and a floor panel of an automobile body structure, respectively; an electrically powered drive motor; at least one gear box including a worm gear drivingly coupled with the drive motor and a worm wheel drivingly meshed with the worm gear; a releaseable bearing assembly rigidly connected to such upper rail member of the first telescopically extendable guide rail structure; a constraint member mounted on an automobile floor panel and having a threaded bore through which the screw shaft threadingly extends; and at least one screw shaft extending in a direction parallel to the longitudinal axis of such upper guide rail in spaced relation thereto and having its opposite end portions journalled removably to the releaseable bearing assembly and the worm wheel.

9 Claims, 8 Drawing Figures

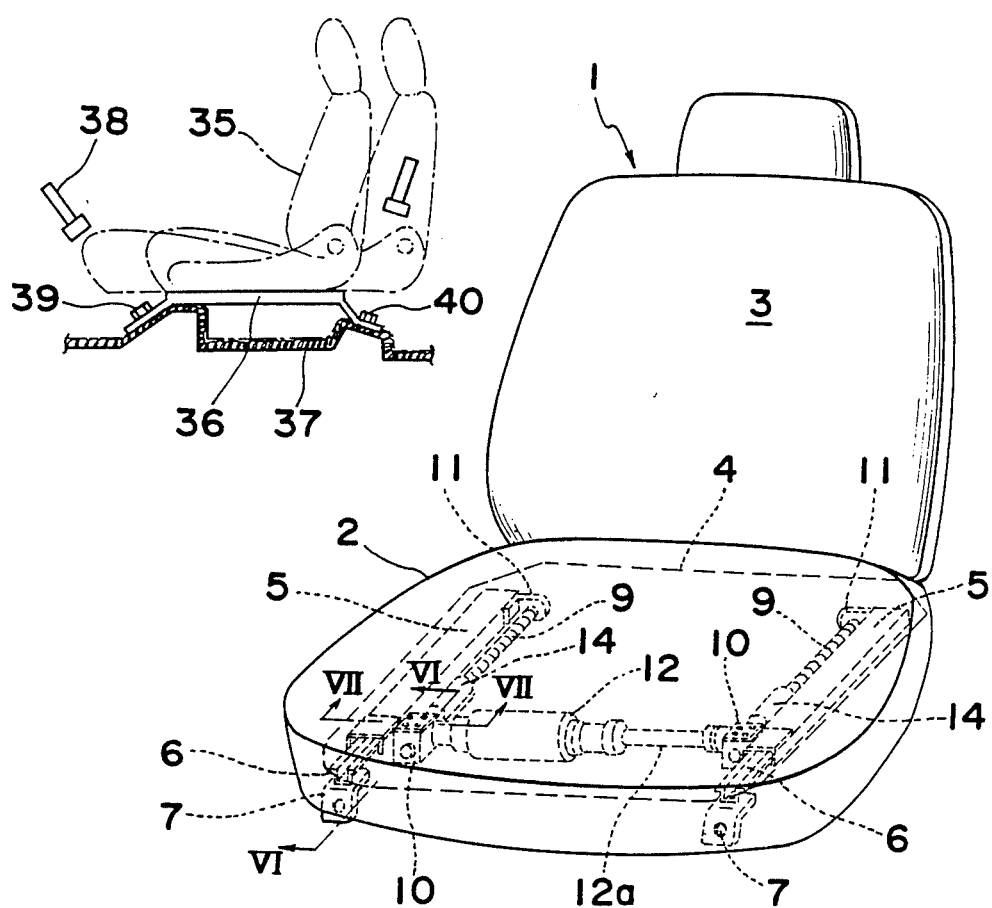
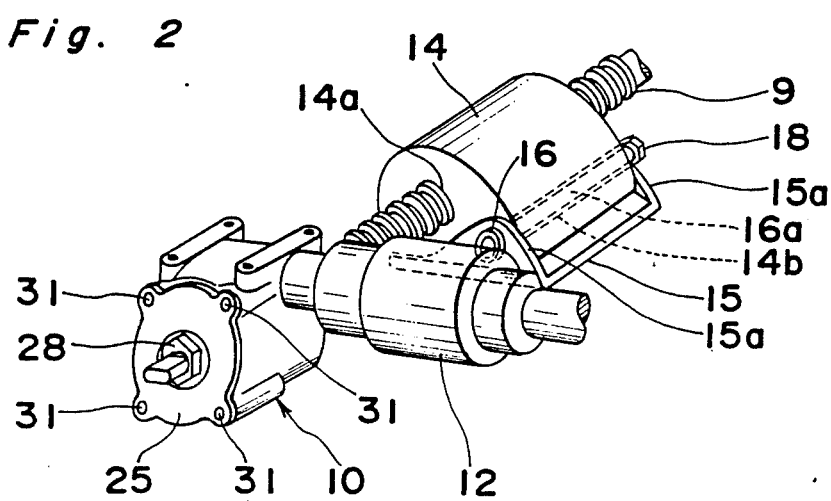

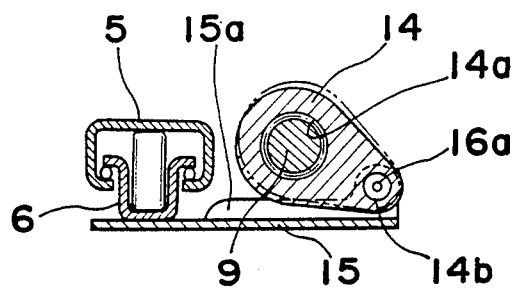
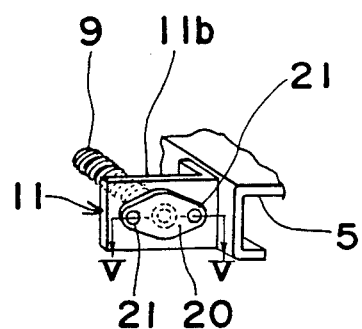
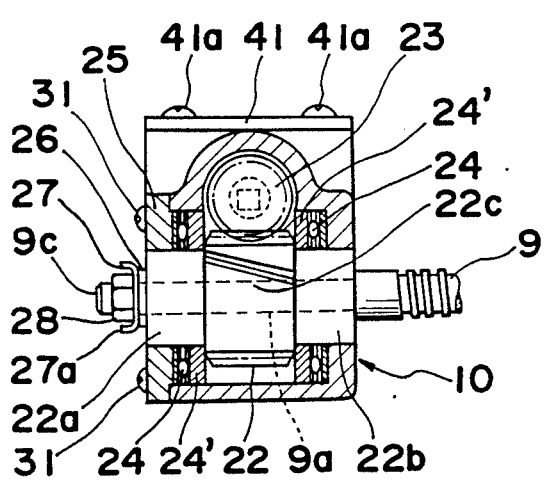
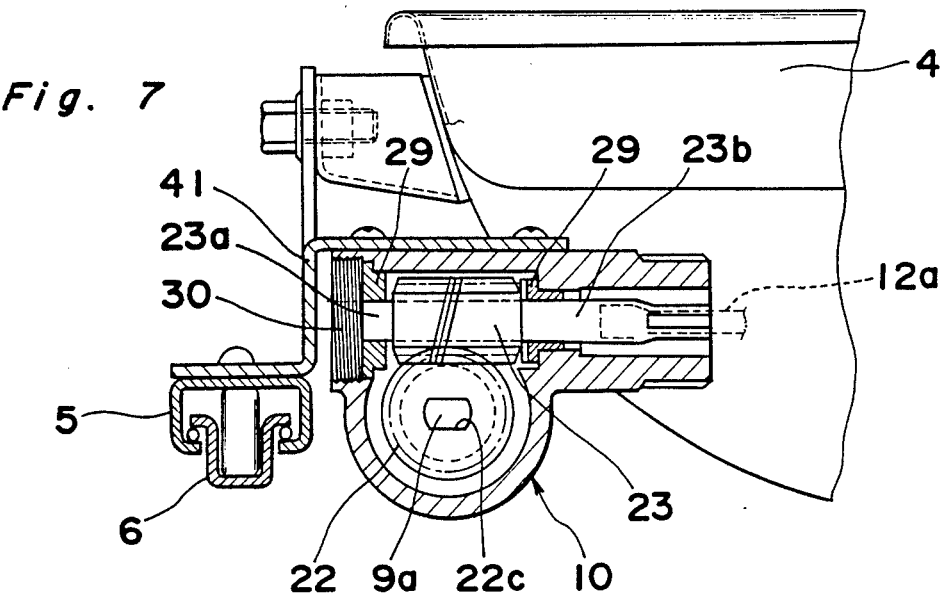

MOTOR DRIVEN SEAT SLIDE MECHANISM

CROSSREFERENCE TO THE RELATED APPLICATIONS

Copending U.S. patent application Ser. No. 895,824 filed Aug. 12, 1986, by Toshihiko Tomita and entitled "Automobile Rear Seat", the invention of which has been assigned to the same assignee of the invention herein disclosed.

BACKGROUND OF THE INVENTION

1. (Field of Technology)

The present invention generally relates to an automobile seat assembly and, more particularly, to a motor-driven seat slide mechanism for the adjustment in position of the automobile seat assembly in a direction generally parallel to the longitudinal sense of an automobile body structure.

2. (Description of the Prior Art)

Motorization of the seat slide mechanism in the field of automobile industry is not a recent development and is disclosed in numerous publications, for example, the Japanese Laid-open Utility Model Publications No. 60-89044, published June 18, 1985, No. 60-125230, published Aug. 23, 1985; and No. 60-127238.

According to the first mentioned two publications, there is disclosed a motor-driven seat slide mechanism which comprises a seat cushion mounted on an automobile floor panel through spaced apart, telescopically extendable guide rail structures; at least one screw shaft journalled at its opposite ends to one of the seat cushion and the floor panel so as to extend in a direction generally parallel to the longitudinal sense of the automobile body structure, specifically, the direction in which the seat assembly is desired to be adjusted; and an electrically powered drive motor having a drive shaft extending perpendicular to, and drivingly coupled with, the screw shaft through a motion translator rigidly mounted on the other of the seat cushion and the floor panel and operable to cause the screw shaft to move axially when the drive shaft of the motor is rotated. In this construction, a rotational force of the drive shaft of the drive motor when the latter is driven can be translated by the motion translator into a linear relative movement of the screw shaft accompanied by the displacement of the seat cushion in a direction generally parallel to the longitudinal sense of the automobile body structure.

The last mentioned publication also discloses a similar motor-driven seat slide mechanism. According to this publication, the screw shaft is rigidly connected at its opposite ends to the lower guide rail rigid with the floor panel of the automobile body structure so as to extend parallel to any one of the upper and lower guide rails. The slide mechanism disclosed therein makes use of a gear box including a worm gear, rigidly mounted on a drive shaft of the motor for movement together therewith, an externally and internally threaded worm wheel having an externally threaded region drivingly engaged with the worm gear and an internally threaded bore. This gear box is supported by the upper guide rail for movement therewith while the screw shaft drivingly extends through the internally threaded bore of the worm wheel so that the gear box can move in a direction axially of the screw shaft relative thereto.

According to the construction disclosed in the last mentioned publication, the upper guide rail, the gear box and the drive motor are all movable together with the seat cushion when the drive motor is operated. The drive of the drive motor is transmitted through the worm gear to the worm wheel which in turn drives the screw shaft to move the gear box, together with the upper guide rail and the drive motor, in a direction axially of the screw shaft relative to such screw shaft.

The prior art seat slide mechanisms hereinabove discussed are generally satisfactory in the sense that the position of the seat assembly relative to the steering wheel where the seat assembly in question is a front seat assembly, or relative to the front seat assembly where the seat assembly in question is a rear seat assembly, can be adjusted in a sophisticated manner.

However, it has been found that difficulties are involved in carrying out a repair when the drive motor breaks down. This will now be discussed in detail with particular reference to FIG. 8 of the accompanying drawings which schematically illustrates how the seat assembly 35 is installed on the floor panel 37 inside the automobile body structure according to the prior art. A pair of lower rail members 36 forming parts of the respective telescopically extendable guide rail structures and extending in a direction parallel to the longitudinal sense of the automobile body structure have their opposite ends secured to the floor panel 37 by means of respective front and rear fastening members 39 and 40 such as bolts. While upper guide rail members (not shown) also forming parts of the respective telescopically extendable guide rail structures and rigidly secured to the seat cushion are guided along the associated lower guide rail members 36, the seat assembly 35 as a whole can be displaced by the drive motor between front and rear positions as shown by the solid and phantom lines, respectively.

In this mounting of the seat assembly 35, in the event of the breakdown of the drive motor, the seat assembly 35 has to be removed from the floor panel 37 together with the telescopically extendable guide rail members so that a servicing man can have an access to the drive motor for the repair or replacement of the drive motor. The removal of the seat assembly 35 to provide the access to the drive motor is generally carried out by undoing ones of the front and rear fastening members 39, 40 and then the others of the front and rear fastening members 39, 40. However, where the drive motor is desired to be replaced or repaired after or while the seat assembly 35 has been moved to the front position as shown by the solid line, the access of a screw driver or any other tool 38 towards the front fastening members 39 tends to be hampered by a front edge portion of the seat cushion overhanging the front fastening members 39.

Similarly, where the drive motor is desired to be replaced or repaired after or while the seat assembly 35 has been moved to the rear position as shown by the phantom line, the access of a screw driver or any other tool 38 towards the rear fastening members 40 tends to be hampered by the seat back hingedly connected to a rear edge portion of the seat cushion.

In this way, the replacement of the repair of the motor which has become out of order is difficult to perform according to the prior art seat slide mechanism, requiring a time-consuming and laborious work to be done.

In my copending application Ser. No. 895,824, arrangement has been made to facilitate the access to the drive motor. According to my copending application, the upper guide rails are connected to the seat cushion through a seat frame structure including a cushion support frame for the support thereon of the seat cushion and a seat carrier frame mounted rigidly on the upper rails and to which the seat back is hingedly connected. The cushion support frame can be separated from the seat carrier frame and, therefore, when the cushion support frame is separated from the seat carrier frame together with the seat cushion, the drive motor and its associated parts can be exposed to the outside through the seat support carrier frame, thereby rendering the drive motor and its associated parts to be accessible to a servicing worker.

SUMMARY OF THE INVENTION

The present invention has therefore been devised with a view to substantially obviating the above described difficulties and has for its essential object to provide an improved motor-driven seat slide mechanism which is designed to enable the seat assembly to be reasonably quickly removed to provide an access to the drive motor when the drive motor is desired to be inspected, replaced or repaired.

Another important object of the present invention is to provide an improved motor-driven seat slide mechanism of the type referred to above, wherein the resistance to the threaded engagement between the screw shaft and the nut member, which would increase when the screw shaft bent persistently or momentarily by reason of, for example, a prolonged use of the seat assembly or an excessive load imposed on the seat assembly, is advantageously minimized to enable the adjustment in position of the seat assembly to be accomplished smoothly.

According to the present invention, the seat cushion is mounted on the floor panel of the automobile body structure through first and second telescopically extendable guide rail structures positioned spaced apart from each other so as to extend in a direction frontwardly and rearwardly with respect to the automobile body structure.

Each of the first and second telescopically extendable guide rail structure comprises upper and lower guide rails connected one above the other for axial sliding movement relative to each other, the upper guide rail being rigidly secured to the seat cushion while the lower guide rail is mounted on the automobile floor panel. The upper guide rail of at least one of the first and second telescopically extendable guide rail structures carries a gear box and a bearing assembly secured to the opposite end portions thereof and spaced apart from each other in a direction parallel to the upper guide rail. The gear box includes a worm gear rigidly mounted on a drive shaft of the drive motor for rotation together therewith, and a worm wheel having external threads meshed with the worm gear.

A screw shaft has its opposite end portions rotatably and axially displaceably supported by the gear box and the bearing assembly and extends parallel to the adjacent upper guide rail, however, a releasable means is provided for preventing the screw shaft from undergoing an axial displacement relative to both of the gear box and the bearing assembly. That end portion of the screw shaft which is supported by the gear box extends through the worm wheel for rotation together therewith and, accordingly, when the drive motor is operated, the screw shaft can be rotated about its own longitudinal axis together with the worm wheel.

In order to enable the seat assembly as a whole to move frontwardly and rearwardly relative to the floor panel, an internally threaded nut member is mounted on the floor panel. The screw shaft extends threadedly through the nut member. Accordingly, when the screw shaft is driven about its own longitudinal axis, the screw shaft and, hence, the seat assembly as a whole, can be axially moved relative to the nut member.

In this construction outlined above, in the event of the malfunctioning of the drive motor, the removal of the releaseable means from the bearing assembly and the gear box permits the opposite end portions of the screw shaft to be disengaged from the bearing assembly and the gear box and, accordingly, the seat assembly can be removed together with the drive motor while leaving the screw shaft retained by the nut member fast with the floor panel.

BRIEF DESCRIPTION OF THE DRAWINGS

These and other objects and features of the present invention will become clear from the following detailed description taken in conjunction with a preferred embodiment thereof with reference to the accompanying drawings in which like parts are designated by like reference numerals and in which:

FIG. 1 is a schematic perspective view of an automobile seat assembly embodying the present invention;

FIG. 2 is a schematic perspective view, on an enlarged scale, showing a gear box and a nut member in relation to a screw shaft;

FIG. 3 is a cross-sectional representation of the nut member taken in a direction perpendicular to the screw shaft;

FIG. 4 is a perspective view showing a bearing assembly;

FIG. 5 is a cross-sectional representation taken along the line V—V in FIG. 4;

FIG. 6 is a cross-sectional view taken along the line VI—VI in FIG. 1;

FIG. 7 is a cross-sectional view taken along the line VII—VII in FIG. 1; and

FIG. 8 is a schematic side sectional view showing the prior art mounting of the seat assembly on an automobile floor panel.

DESCRIPTION OF THE PREFERRED EMBODIMENTS

Referring first to FIG. 1, an automobile seat assembly generally identified by 1 comprises a seat cushion 2 and a seat back 3 hingedly connected at a lower edge portion to a rear edge portion of the seat cushion 1 so as to assume a generally L-shaped configuration as is well known to those skilled in the art. The seat cushion 1 includes any known cushioning material and a generally rectangular perforated base plate 4 on which the cushioning material is placed.

A telescopically extendable guide rail structure for each side of the seat assembly is interposed between the seat cushion 1 and the floor panel 37 (FIG. 8) and comprises an upper guide rail 5 firmly secured to a respective side portion of the base plate 4 through a respective elongated bracket 41 so as to extend in a direction conforming to the direction in which the seat assembly is desired to be adjusted in position, and also a lower guide rail 6 rigidly mounted on the floor panel 37 as will be described in details later. Each telescopically extendable guide rail structure referred to above may be of any known construction, and may include two rows of bearing balls and a row of spacer rollers all movably interposed between the respective upper and lower guide rails 5 and 6 as can readily be understood from FIGS. 3 and 7, for facilitating a smooth movement of one of the upper and lower guide rails 5 and 6 relative to the other of the upper and lower guide rails 5 and 6. As a matter of design, the upper and lower guide rails 5 and 6 of each telescopically extendable guide rail structure are so designed and so shaped in section that, while the both can slide relative to each other, the both cannot be separated away from each other in a direction perpendicular to the longitudinal axis of any one of the upper and lower guide rails 5 and 6.

So far illustrated, the upper guide rails 5 secured respectively to the opposite side portions of the base plate 4 in parallel relation to each other are positioned inwardly therebetween and carry respective screw shafts 9 extending parallel to each other and also to the adjacent upper guide rails 5. Each of these screw shafts 9 has a front end portion 9a operatively received in a gear box 10. This gear box 10 is rigidly secured through a plurality of, for example, four fastening members, for example, rivets or bolts, to that portion of the support bracket 41 which is bent from the body of the bracket 41 so as to extend underneath the base plate 4, as best shown in FIG. 7. A rear end portion 9b of the respective screw shaft 9 is operatively received in a bearing assembly 11 which is similarly rigidly secured to a rear end portion of the associated upper guide rail 5 as best shown in FIG. 4.

While the details of the gear box 10 for each screw shaft 9 will be described later, the details of the bearing assembly 11 for each screw shaft 9 are best shown in FIGS. 4 and 5, reference to which will now be made.

The bearing assembly 11 comprises a generally rectangular bearing plate 11b welded or rigidly secured at one end to the upper rail 5 and having an opening 11a defined therein, said opening 11a being of a diameter greater than the maximum outer diameter of the respective screw shaft 9 so that the latter can pass freely through the opening 11a. The bearing assembly 11 also comprises an end plate 20 having a bearing recess 20a defined therein of a diameter substantially equal to the minimum outer diameter of the respective screw shaft 9, that is, the diameter of a non-threaded rear end 9b of the respective screw shaft 9. The end plate 20 is removably secured by means of a plurality of, for example, two bolts 21 to the bearing plate 11b with the bearing recess 20a aligned with the opening 11a in the bearing plate 11b.

Thus, the bearing assembly 11 is so designed and so structured that the non-threaded rear end 9b of the respective screw shaft 9 can be loosely accommodated in the opening 11a in the bearing plate 11b and be rotatably supported in the bearing recess 20a in the end plate 20.

Referring now to FIGS. 2, 6 and 7, the gear box 10 for each telescopically extendable guide rail structure has accommodated therein a worm wheel 22 and a worm gear 23 constantly meshed with the worm wheel 22. The worm gear 23 is mounted on one of the opposite drive shafts 12a of an electrically powered drive motor 12 adjacent the associated telescopically extendable guide rail structure for rotation together therewith, said drive shafts 12a extending in opposite directions away from the drive motor 12 as best shown in FIG. 1.

The worm wheel 22 is of a design having a pair of hubs 22a and 22b integrally formed therewith so as to protrude in respective directions away from the worm wheel 22 in alignment with the axis of rotation of the worm wheel 22. The worm wheel 22 is rotatably supported within the gear box 10 with the hub 22b rotatably received in a hole defined in a wall of the gear box 10 and the hub 22a rotatably received in a hole defined in a removable cover plate 25.

The cover plate 25 is fitted by means of a plurality of screws 31 to the gear box 10 at a location on one side of the worm wheel 22 opposite to the hub 22b. A set of a thrust bearing 24 and a thrust ring 24' is mounted exteriorly on the hub 22b and positioned between the worm wheel 22 and that wall of the gear box 10 which rotatably supports the hub 22b, and, similarly, another set of a thrust bearing 24 and a thrust ring 24' is mounted exteriorly on the hub 22a and positioned between the worm wheel 22 and the cover plate 25.

The solid body including the worm wheel 22 and the hubs 22a and 22b integral with the worm wheel 22 has a through-hole 22c defined therein in alignment with the axis of rotation of the worm wheel 22 for receiving a non-threaded front end portion 9a of the screw shaft 9. The non-threaded front end portion 9a of the screw shaft 9 is of a generally rectangular cross-sectional shape defined by cutting opposite side regions of the non-threaded front end portion 9a of the screw shaft 9. Accordingly, the through-hole 22c defined in the solid body including the worm wheel 22 and the hubs 22a and 22b is of such a shape complemental to the cross-sectional representation of the non-threaded front end portion 9a of the screw shaft 9 that, when the worm wheel 22 is driven by the motor 12 through the worm gear 23, the screw shaft 9 can be rotatable together with the solid body including the worm wheel 22 and the hubs 22a and 22b.

The non-threaded front end portion 9a of each screw shaft 9 has its front end extremity 9c positioned exteriorly of the gear box 10 and formed with helical threads for receiving a nut member 28. Thus, with the non-threaded front end portions 9a of the respective screw shaft 9 received in the through-hole 22c in the body including the worm wheel 22 and the hubs 22a and 22b, the nut member 28 is threaded onto the front end extremity 9c of the screw shaft 9 with ring washers 26 and 27 interposed between the nut member 28 and the hub 22a as best shown in FIG. 6.

Thus, it will readily be seen that the screw shaft 9 is rotatably supported at its opposite end by the bearing assembly 11 and the gear box 10 while a substantially intermediate portion thereof extends parallel to the adjacent telescopically extendable guide rail structure.

As best shown n FIG. 7, the worm gear 23 has its opposite ends 23a and 23b supported within the gear box 10 by means of respective bearing sleeves 29 and is axially immovably retained in position inside the gear box 10 by a threaded plug member 30 held in abutment with the bearing sleeve 19 adjacent the end 23a of the worm gear 23. As hereinbefore described, the worm gear 23 firmly receives therein one of the opposite drive shafts 12a of the drive motor 12 so as to be rotatable together with the drive shafts 12a of the drive motor 12.

In the construction so far described, when the drive motor 12 is rotated, the worm gear 23 rigid with the drive shaft 12 drives the worm wheel 22 causing the associated screw shaft 9 to be rotated about its own longitudinal axis.

In order for the seat assembly 1 to be slid selectively frontwards and rearwards relative to the lower guide rails 6 of the respective telescopically extendable guide rail structures when the screw shafts 9 are rotated in the manner as hereinabove described, a constraint block 14 for each of the screw shafts 9 is employed and mounted on the floor panel 37 of the automobile body structure. The constraint block 14 has a threaded holes 14a through which the associated screw shaft 9 extends threadingly. Thus, it will readily seen that, when the associated screw shaft 9 is rotated about its own longitudinal axis, the associated screw shaft 9 undergoes an axial movement relative to the constraint block 14, permitting the upper guide rail 5 to move axially relative to the lower guide rail 5 and, hence, permitting the seat assembly as a whole to slide relative to the floor panel 37.

Preferably, each of the constraint blocks 14 is mounted on the floor panel 37 at a location generally intermediate of the length of the lower guide rail 6 of the associated telescopically extendable guide rail structure.

It may happen that, when one or both of the screw shafts 9 band, the threaded engagement between each screw shaft and the associated constraint block 14 will become so tight that the drive motor 12 will be undesirably loaded. Accordingly, in accordance with another feature of the present invention, each of the constraint blocks 14 is mounted on the floor panel 37 for swinging motion in a direction generally perpendicular to the adjacent screw shaft 9. For this purpose, as best shown in FIGS. 2 and 3, each constraint block 14 has a bearing hole 14b defined therein in parallel relation to, and spaced a distance from, the threaded hole 14a and is loosely mounted on the floor panel 37 through a generally U-shaped bracket 15 in a manner which will now be described.

The bracket 15 has a base and a pair of upright lugs 15a and is mounted on the floor panel 27 with the base welded or, otherwise, rigidly connected thereto. The upright lugs 15a are spaced a distance substantially equal to the length of the associated constraint block 14 so as to avoid any displacement of the constraint block 14 in a direction parallel to the adjacent screw shaft 9 and has respective holes through which a mounting bolt 16 extends. More specifically, with the associated constraint block 14 received in a space between the upright lugs 15a while the holes in the respective upright lugs 15a are aligned with the bearing hole 14b in the constraint block 14, the mounting bolt 16 having a head at one end thereof is passed through the hole in one of the upright lugs 15a, then through the bearing hole 14b and finally through the hole in the other of the upright lugs 15a with a nut 18 firmly fastened to the other end of the mounting bolt 16a. As can readily understood from FIG. 3, the mounting bolt 16 is of a type having its substantially intermediate portion 16a of a diameter smaller than the diameter of the bearing hole 14b in the constraint block 14 so that the constraint block 14 can be displaceable in a direction perpendicular to the mounting bolt 16, as shown by the phantom line therein, while the mounting bolt 16 is retained in position at its opposite ends by the upright lugs 15a.

Thus, it will readily be understood that any possible bending of the screw shaft 9 is accompanied by the loose pivotal motion of the associated constraint block 14 about the mounting bolt 16 and, therefore, the possibility of the drive motor 12 being overloaded which would results in the tight threaded engagement between threads of the screw shaft 9 and threads in the threaded hole 14a can be substantially eliminated.

From the foregoing description, it has now become clear that, when the drive motor 12 is driven, the screw shafts 9 are rotated about their own longitudinal axes while simultaneously moving axially thereof relative to the constraint blocks 14, causing the upper guide rails 5 and, hence, the seat cushion 2, to move relative to the automobile floor panel 37.

Should the drive motor 12 malfunction when and after the seat assembly 1 has been moved to the rearward position, the servicing worker has to undo the bolts 21 to remove the end plates 20 which have been secured to the respective bearing plates 11b of the bearing assemblies 11, so that the screw shafts 9 can be freely passed through the openings 11a in the respective bearing plates 11b. Thereafter, the nut members 28 and the ring washers 26 and 27 have to be removed from the front extremities 9c of the respective screw shafts 9, followed by the removal of the screws 31 to permit the cover plates 25 to be separated from the respective gear boxes 10. Once the cover plates 25 are separated from the respective gear boxes 10, the worm wheels 22 are in position ready to be removed from the non-threaded front end portions 9a of the associated screw shafts 9.

After the end plates 20 and the cover plates 25 have been successively removed in the manner as hereinabove described, and when the seat assembly 1 is subsequently manually pushed forwards, the gear boxes 10 separate away from the front end portions 9a of the associated screw shafts 9, then retained in position by the respective constraint blocks 14, while permitting the end extremities 9c to pass through the worm wheels 23 and the hubs 23a and 23b. At the same time, the rear end portions 9b of the respective screw shafts 9 are passed through the openings 11a in the bearing plates 11b as the seat assembly 1 is so pushed forwards. Therefore, after the seat assembly 1 has been pushed forwards to separate the gear boxes 10 from the front end portions 9a of the respective screw shafts 9, and when the seat assembly 1 once pushed forwards is pulled rearwards, the bearing plates 11a of the bearing assemblies 11 are separated away from the rear end portions 9b of the associated screw shafts 9, with the seat assembly 1 consequently detached from the floor panel while leaving the screw shafts 9 as retained by the constraint blocks 14.

On the other hand, should the drive motor 12 malfunction when and after the seat assembly 1 has been moved to the frontward position, the servicing worker has to undo the nut members 28 and the ring washers 26 and 27, followed by the removal of the screws 31 to make the cover plates 25 to be separated from the respective gear box 10. Thereafter, the bolts 21 should be loosened to allow the end plates 20 of the bearing assemblies 11 to be removed from the associated bearing plates 11b. After the cover plates 25 and the end plates 20 have been successively removed in the manner as hereinabove described, and when the seat assembly 1 is subsequently manually pushed rearwards, the bearing plates 11b separate away from the rear end portions 9b of the associated screw shaft while respective spaces in the gear boxes 10 loosely accommodate therein the front end portions 9a of the associated shafts 9. Therefore, after the seat assembly 1 has been pushed rearwards to separate the bearing plates 11b away from the rear end portions 9b of the associated screw shafts 9, and when the seat assembly 1 once pushed rearwards is pulled frontwards, the bearing boxes 10 separate away from the front end portions 9a of the respective screw shafts 9, with the seat assembly 1 consequently detached from the floor panel while leaving the screw shafts 9 as retained by the constraint blocks 14.

Thus, it has now become clear that, in the event that the drive motor 12 fails to operate properly by any reason and the repair or replacement thereof is required while the seat assembly 1 is positioned at either the forward position or the rearward position, the seat assembly 1 carrying the drive motor 12 can be detached from the automobile floor panel with no substantial difficulty. Nevertheless, by following the procedures substantially reverse to that described hereinabove, the seat assembly once detached from the automobile floor panel can be mounted on the automobile floor panel again after the drive motor and its associated parts have been repaired or replaced.

Although the preset invention has been fully described in connection with the preferred embodiment thereof with reference to the accompanying drawings, it is to be noted that any changes and modifications not departing from the scope of the present invention as defined by the appended claims are to be understood as included therein.

I claim:

1. A motor-driven seat slide mechanism comprising:
   a cushion assembly including a base plate;
   spaced apart, first and second telescopically extendable guide rail structures one for each side of the cushion assembly, each of said telescopically extenable guide rail structures including upper and lower guide rail members connected one above the other for axial movement relative to each other, said upper and lower guide rail members being connected to the base plate and a floor panel of an automobile body structure, respectively;
   an electrically powered drive motor;
   at least one gear box connected to said upper guide rail member at one end of the base plate and including a worm gear and a worm wheel drivingly meshed with said worm gear, said worm gear being drivingly coupled with the drive motor;
   a releaseable bearing means rigidly connected to said upper guide rail member of the first telescopically extendable guide rail structure at an end of the base plate opposite said one end;
   a constraint member mounted to an automobile floor panel and having a threaded bore through which a screw shaft threadingly extends; and
   the screw shaft extending in a direction parallel to the longitudinal axis of said upper guide rail member in spaced relation thereto, said screw shaft having one end portion journalled removably to the releaseable bearing means and the opposite end portion removably coupled with the worm wheel within the gear box.

2. The mechanism as claimed in claim 1, wherein said opposite end portion of the screw shaft has a generally rectangular cross-sectional shape, and said worm wheel has defined therein an opening complemental in shape to the cross-sectional shape of said opposite end portion of the screw shaft, said opposite end portion of the screw shaft being axially displaceably passed through the opening in the worm wheel for rotation together therewith.

3. The mechanism as claimed in claim 2, wherein said gear box is rigidly secured to the upper rail member of at least the first telescopically extendable guide rail structure at a location adjacent one end of such upper guide rail member.

4. The mechanism as claimed in claim 2, wherein the gear box has a pair of bearing bores for the support of respective opposite ends of the worm wheel, each of said support bores having a diameter greater than the diameter of the screw shaft.

5. The mechanism as claimed in claim 2, wherein said drive motor has a pair of drive shafts extending in opposite directions away from each other, and said worm gear is drivingly coupled with one of said drive shafts, and wherein an additional combination of the gear box, the releaseable bearing assembly, the gear box and the constraint member is provided for the other of the telescopically extendable guide rail structure, the other of said drive shaft being drivingly coupled with the worm gear in the gear box of the additional combination.

6. The mechanism as claimed in claim 2, wherein the constraint member is positioned substantially intermediate of the length of the lower guide rail.

7. A motor driven seat slide mechanism comprising:
   a cushion assembly including a base plate;
   spaced apart, first and second telescopically extendable guide rail structures one for each side of the cushion assembly, each of said telescopically extendable guide rail structures including upper and lower guide rail members connected to the base plate and a floor panel of an automobile body structure, respectively;
   an electrically powered drive motor;
   at least one gear box including a worm gear and a worm wheel driving meshed with said worm gear, said worm gear being drivingly coupled with said drive motor;
   a releasable bearing means rigidly connected to said upper guide rail member of the first telescopically extendable guide rail structure;
   a constraint member mounted on an automobile floor panel and having a threaded bore through which the screw shaft threadingly extends and positioned intermediate of the lower guide rail length;
   at least one screw shaft extending in a direction parallel to the longitudinal axis of said upper guide rail in spaced relation thereto, said screw shaft having one end portion journalled removably to the releaseable bearing means and the opposite end portion removably coupled with the worm wheel within the gear box;
   the opposite end portion of the screw shaft being of a generally rectangular cross-sectional shape, said worm wheel having defined therein an opening complemental in shape to the cross-sectional shape of said opposite end portion of the screw shaft, said opposite end portion of the screw shaft being axially displaceably passed through the opening in the worm wheel for rotation therewith; and
   a generally U-shaped bracket means rigidly mounted on the automobile floor panel and having a pair of spaced bearing lugs and a mounting shaft extending between the bearing lugs, said constraint member having a mounting hole defined therein in spaced and parallel relation to the threaded bore, said constraint member being pivotally supported by the bracket means with the mounting shaft extending through the mounting hole.

8. The mechanism as claimed in claim 7, wherein the mounting hole has a diameter greater than the diameter of the mounting shaft.

9. The mechanism as claimed in claim 1, wherein the releaseable bearing means and the gear box are connected to the upper guide rail member.

* * * * *